B. BRADFORD.
RIM FOR PNEUMATIC TIRES.
APPLICATION FILED MAR. 29, 1910.
1,090,114.
Patented Mar. 10, 1914.
2 SHEETS—SHEET 1.
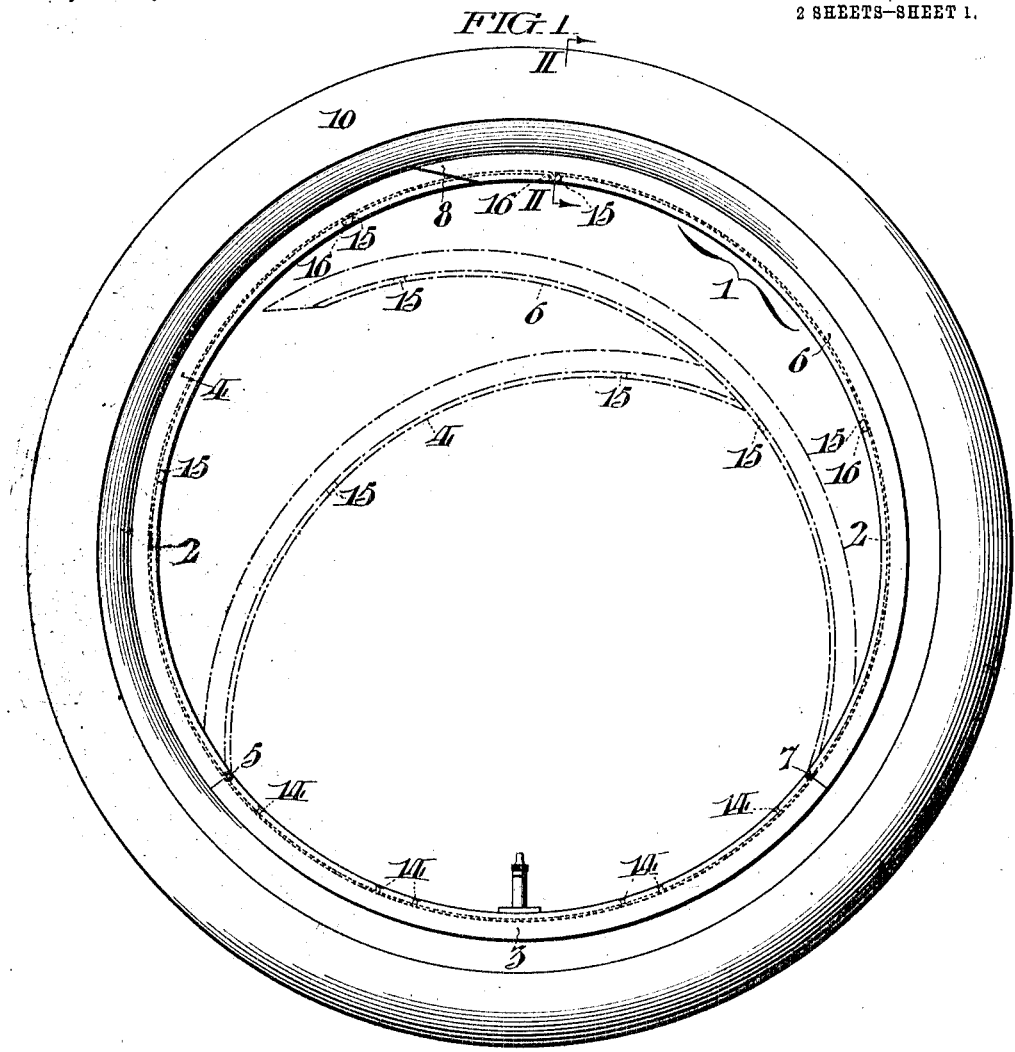
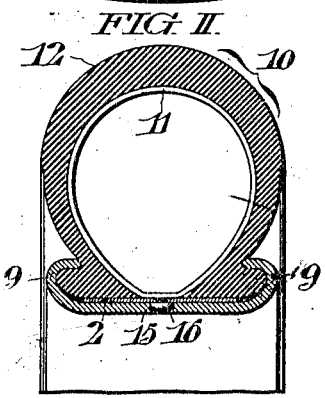
Inventor
Benaiah Bradford,

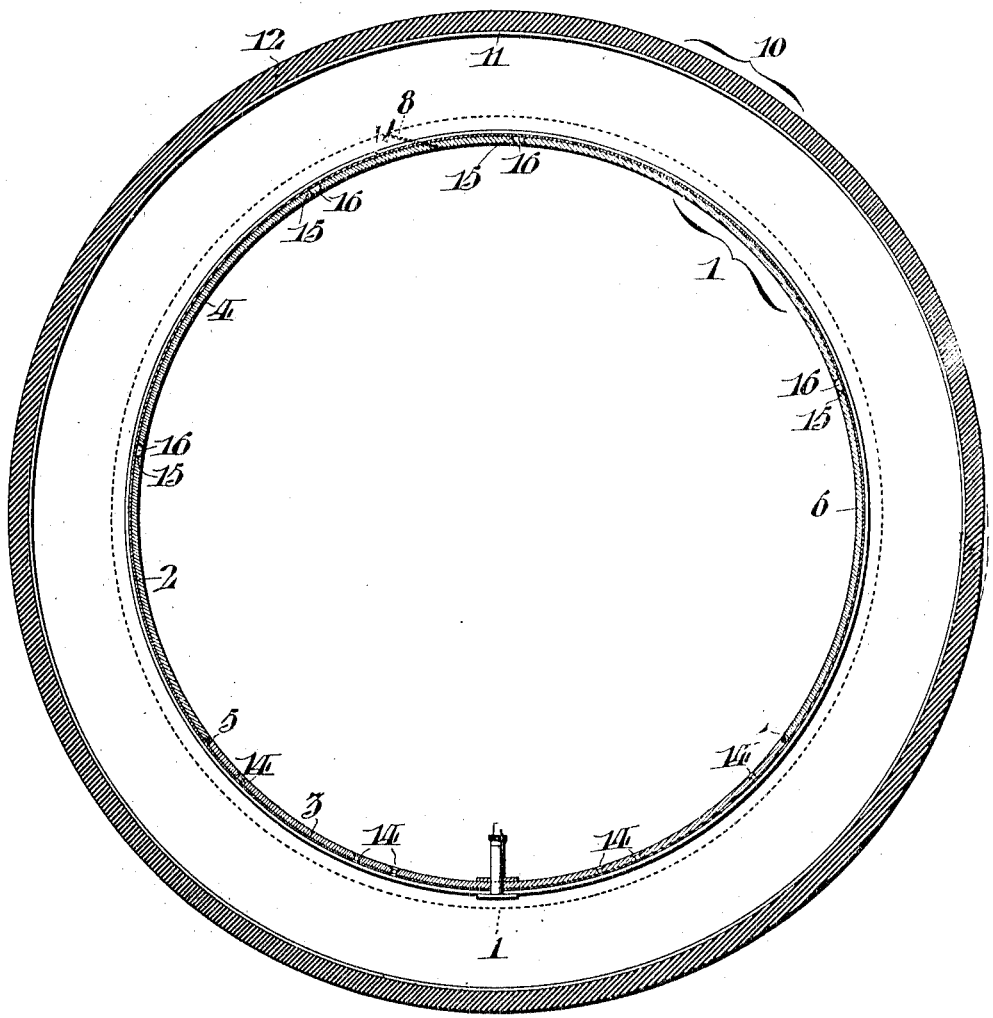

UNITED STATES PATENT OFFICE.

BENAIAH BRADFORD, OF NORRISTOWN, PENNSYLVANIA, ASSIGNOR TO LEE TIRE & RUBBER CO., OF CONSHOHOCKEN, PENNSYLVANIA, A CORPORATION OF PENNSYLVANIA.

RIM FOR PNEUMATIC TIRES.

1,090,114.      Specification of Letters Patent.      Patented Mar. 10, 1914.

Application filed March 29, 1910. Serial No. 552,192.

*To all whom it may concern:*

Be it known that I, BENAIAH BRADFORD, of Norristown, in the county of Montgomery and State of Pennsylvania, have invented certain new and useful Improvements in Rims for Pneumatic Tires, whereof the following is a specification, reference being had to the accompanying drawings.

The invention relates to new and useful improvements in rims for pneumatic tires, and more especially to demountable rims which are adapted to be connected to the tire before said rim is placed on the body of the wheel.

An object of the invention is to provide a rim which is divided into segmental sections, which sections are movably secured together in any desired manner, and to also provide a limiting ring which coöperates with said sectional rim and holds the same in proper relation to the tire before the rim is placed on the body of the wheel, and which further coöperates with said sectional rim in holding the same on the rim proper or felly of the wheel.

The invention consists in the parts and arrangements hereinafter described and set forth in the appending claims.

In the drawings, Figure I, is a side view of a pneumatic tire, having my improved rim attached thereto, showing in dotted lines the segments of the rim moved to position for detaching the rim from the tire. Fig. II, is a sectional view on the line II, II, of Fig. I. Fig. III, is a sectional view through the rim and limiting ring, taken in the plane of the wheel.

My invention, as herein shown, resides in a rim 1, and a limiting ring 2. The rim 1, as shown in Figs. I, and II, consists of a segmental section 3, and a segmental section 4, which is, as herein shown, hinged at 5, to the section 3. It will be obvious however, that the sections may be connected in any desired manner. Said rim also comprises a section 6, which is similarly connected at 7, to the section 3. The outer end of the section 6, is preferably chamfered as at 8, and is adapted to engage the correspondingly chamfered end of the section 4. The rim 2, as shown in Fig. II, is formed with integral flanges 9, which are adapted to receive the clenching flanges of the tire 10, for locking the tire to the rim. The tire, as herein shown, is the usual form, having the inner tube 11, and an outer shoe 12.

Coöperating with the sectional rim 1, is a ring 2, which is preferably a single integral structure. Said ring is also preferably of substantially the same width as the distance between the edges of the flanges, only sufficient space being left to allow the ring to slip readily between the flanges of the rim, and seat against the inner face of said rim. Said ring may, if desired, be secured to the segment 3, of the sectional rim by suitable rivets 14, although it will be understood that from certain aspects of the invention, the ring may be entirely separate from the sectional rim. The sectional rim may also be provided with a plurality of apertures 15, which are adapted to receive projecting lugs or dowels 16, secured to the ring. Said lugs engage the apertures in the rim and prevent all possible creeping of the ring relative to the rim.

In the operation of my device, the segments of the sectional rim are moved to the position shown by dotted lines in Fig. I, the inner tire either collapsed or partly collapsed, so that the flanges of the outer shoe may be readily inserted between the flanges of the section 3, of the rim. The ring 2, is first placed within the rim, so as to be located between the rim and the tire. The section 6, is then swung into the position shown in full lines in Fig. I, and the flanges of the shoe can be readily inserted between the flanges of this section of the rim. The segment 4, is then moved to the position shown in full lines in Fig. I, and similarly connected to this section of the rim. When the parts are thus positioned, the inner tube is inflated. The ring 2 rests against the inner face of the outer shoe 12. When the inner tube is inflated, the expansion of the tube in the plane of the wheel and toward the center of the wheel will be prevented by said ring, and, as a consequence, said inner tube will expand to a greater extent laterally or transversely to the plane of the wheel. This lateral expansion of the inner tube causes an outward movement of the flanges on the tire. This outward movement of the flanges on the tire will be necessarily upward as well as outward, and, therefore, said flanges on the tire will be carried into the flanges 9—9 on the rim and will lift upward on said flanges, thus expanding the sectional rim. The ring 2 will, however, limit this outward movement of the sectional rim, and the continued force of the inflated tire will, therefore, lock the outer shoe, the sectional rim, and the ring firmly together, thus holding the sectional rim on the inflated tire.

When it is desired to replace the tire on a wheel, the rim of the wheel is removed, and my sectional rim, together with the inflated tire, slipped on to the body of the wheel, and the usual wedges or clamping screws or other securing means operated to secure said rim to the body of the wheel. The outward pressure of the securing means against the sectional rim will force said sectional rim against the limiting ring, and the tire is thereby firmly secured to the body of the wheel.

Having thus described my invention, I claim:—

1. The combination of an outer shoe having flanges, an inner pneumatic tube, a sectional rim for said shoe, said rim having integral flanges adapted to engage the flanges on said tire, a ring attached to one of said rim sections and extending from one end thereof to the other end of said rim section, the other rim sections being free of said ring, and having adjacent ends chamfered, said ring being adapted to engage the inner faces of the flanges on the tire and limit the inward movement of the inner tube when inflated, whereby the inflation of said inner tube will cause the flanges on the tire to move outward into engagement with the flanges on said segmental rim, said ring also limiting the outward movement of the rim sections caused by the inflating of said tube.

2. The combination of an outer shoe having flanges, an inner pneumatic tube, a sectional rim for the shoe, said rim having flanges adapted to engage the flanges on the tire, an integral ring encircling the rim and located between the flanges on the rim, said ring being attached to one of said rim sections, the other rim sections being hinged to the respective ends of the rim section to which the ring is attached and having their adjacent ends chamfered, said ring being adapted to engage the inner faces of the flange on the tire and limit the inward movement of the inner tube when inflated whereby the inflation of said inner tube will cause the flanges on the tire to move outward into engagement with the flanges on the segmental rim, said ring also limiting the outward movement of the rim sections caused by the inflation of said tube.

In testimony whereof, I have hereunto signed my name at Philadelphia, Pennsylvania, this 28th day of March, 1910.

BENAIAH BRADFORD.

Witnesses:
 JAMES H. BELL,
 E. L. FULLERTON.